United States Patent
Hattori

[11] Patent Number: 5,953,501
[45] Date of Patent: Sep. 14, 1999

[54] RECONSTRUCTION DEVICE FOR COMPRESSED BINARY IMAGE DATA

[75] Inventor: Toshiyuki Hattori, Nagano, Japan

[73] Assignee: Seiko Epson Corporation, Tokyo, Japan

[21] Appl. No.: 08/733,110

[22] Filed: Oct. 16, 1996

[30] Foreign Application Priority Data

Oct. 16, 1995 [JP] Japan ................................ 7-267520

[51] Int. Cl.[6] .......................... B41B 15/00; G06K 9/36; H04N 1/415
[52] U.S. Cl. .................. 395/115; 395/115; 395/114; 382/232; 358/432; 358/433
[58] Field of Search .................. 395/115, 114; 382/232; 358/432, 433, 515; 364/515

[56] References Cited

U.S. PATENT DOCUMENTS

| | | | |
|---|---|---|---|
| 3,992,572 | 11/1976 | Nakagome et al. | 178/6 |
| 4,058,674 | 11/1977 | Komura | 358/260 |
| 4,315,318 | 2/1982 | Kato et al. | 364/515 |
| 5,452,405 | 9/1995 | Vondran, Jr. | 395/114 |

FOREIGN PATENT DOCUMENTS

| | | | |
|---|---|---|---|
| 0 053 935 | 6/1982 | European Pat. Off. | H04N 1/40 |
| 0 378 762 | 7/1990 | European Pat. Off. | H04N 1/417 |
| 6-282411 | 10/1994 | Japan | G06F 5/00 |

*Primary Examiner*—Edward L. Coles
*Assistant Examiner*—Twyler Lamb
*Attorney, Agent, or Firm*—Sughrue, Mion, Zinn, Macpeak & Seas, PLLC

[57] ABSTRACT

A CPU converts data received from a host device into binary image data and compresses the data, and thereafter writes the compressed data into an image buffer in a RAM. In this compression, a method is employed in which, in a manner similar to the Huffman code compression method, an attention-directed byte is compressed on the basis of a correlation between the byte and a preceding byte. The compressed image data are DMA-transferred to a reconstruction/smoothing circuit. The reconstruction/smoothing circuit is configured by adding logic circuits for reconstruction to a smoothing circuit known in the conventional device, and reconstructs the compressed data by using a circuit which is in the smoothing circuit and which holds a preceding byte, or by referencing the held preceding byte.

5 Claims, 8 Drawing Sheets

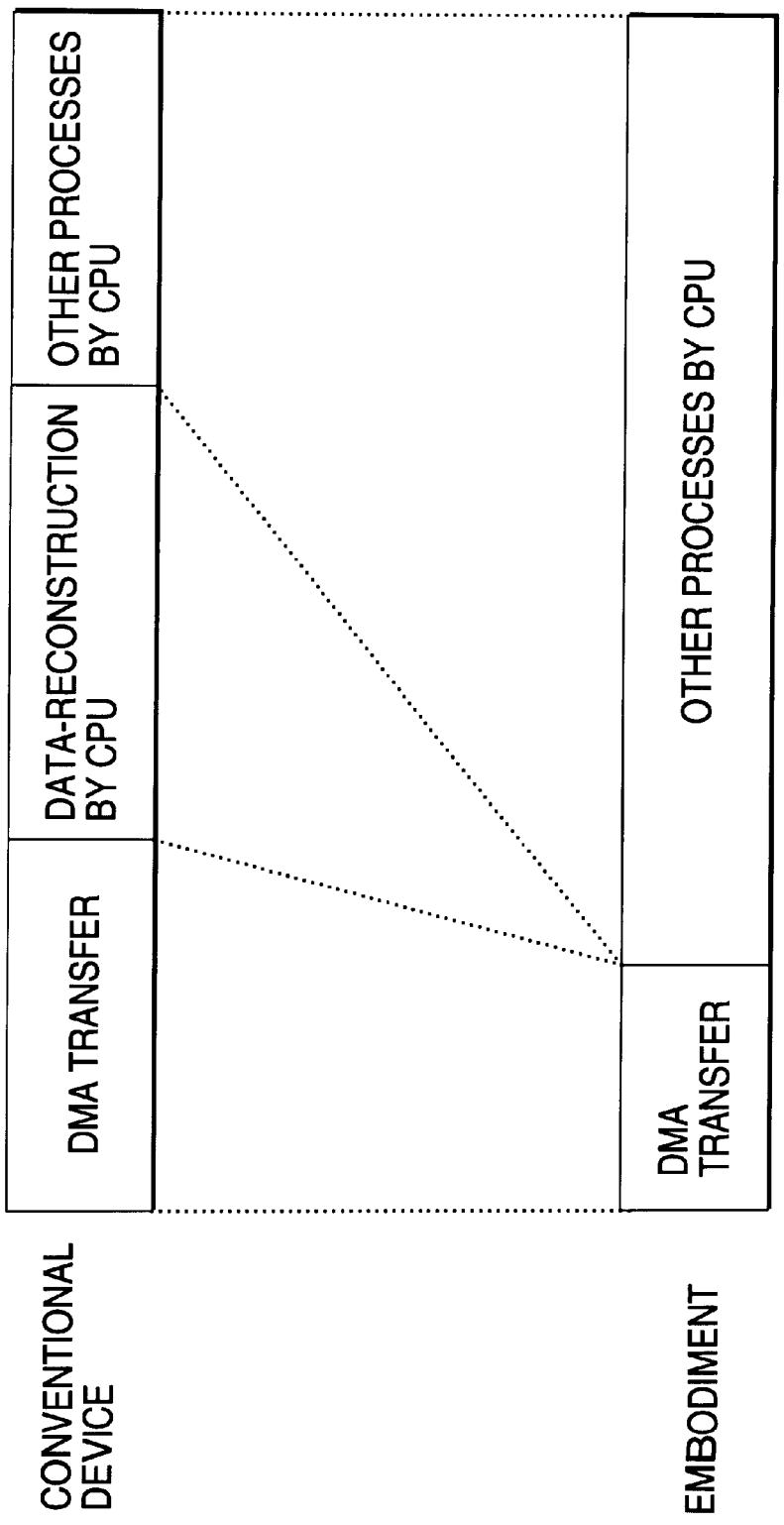

RECONSTRUCTION DEVICE FOR COMPRESSED BINARY IMAGE DATA

BACKGROUND OF THE INVENTION

1. Field of the Invention

The invention relates to an improvement of a device which, when binary image data indicative of existence/nonexistence of dots and stored in a memory in a compressed state are to be transferred to a printer engine of a laser printer or the like, reconstructs the compressed binary image data to the original form.

2. Description of the Related Art

In a digital printer such as a laser printer, image data received from a host computer are first converted into binary image data indicative of existence/nonexistence of dots and then stored in a memory (buffer), and the binary image data are read out from the memory and then transferred to a printer engine which is an execution unit of the printer. Since a printer engine is increasingly improved in printing speed and resolution, such a printer must have an ability of rapidly transferring a large amount of data to the printer engine.

In a high resolution system, it is required to handle a large amount of binary image data. In order to store such a large amount of binary image data in a memory of an appropriately small size, therefore, the binary image data are usually compressed and then stored into the memory. Various kinds of compression methods are known. When compressed binary image data in the memory are read out from the memory and transferred to the engine, the data are reconstructed to the original form.

FIG. 1 schematically shows the configuration of a conventional printer which operates in the manner described above. The printer receives image data from a host computer which is not shown, via an interface circuit 2. The image data are converted into binary image data corresponding to a dot image and then compressed, by a CPU 4. The compressed data are written into an image buffer 10 in a RAM 8. Thereafter, the compressed data in the image buffer 10 are sequentially read out and reconstructed to the original form by the CPU 4. The reconstructed image data are expanded in a print buffer (for example, a band buffer) 12 in the RAM 8. The binary image data in the band buffer 12 are directly read out in a sequential manner by a DMA (Direct Memory Access) circuit 16, and then sent to a smoothing circuit 18. The smoothing circuit 18 corrects the image data so as to smooth unnatural irregularities of outlines of characters such as letters and graphics in the image. The corrected image data are sent to a printer engine 24 via a video interface 22.

In the conventional printer shown in FIG. 1, there frequently occurs a process in which a system bus 14 is occupied for the transmission of image data, with the result that each process consumes a considerable time period, thereby impeding the speed-up of the printer. Specifically, as seen from the above description with reference to FIG. 1, the system bus 14 is occupied for the transmission of image data in all of the following processes: a process in which the printer receives image data from the host computer; a process in which the CPU 4 converts image data from the host computer into binary image data, compresses the binary data, and writes the compressed data into the image buffer 10; that in which the CPU 4 reads out the image data from the image buffer 10, reconstructs the image data, and writes the reconstructed data into the image buffer 12; and that in which the DMA circuit 16 transfers the reconstructed image data in the band buffer 12 to the smoothing circuit 18. Therefore, these processes cannot be simultaneously conducted so that the proportions of the time periods respectively allocated to the processes are inevitably lowered. As a result, the total processing time is prolonged and a high-performance CPU, which is expensive, must be used in order to speed the printer.

SUMMARY OF THE INVENTION

Therefore, it is an object of the invention to enable a printer to rapidly reconstruct compressed binary image data, thereby allowing the printer to easily realize the speed-up and the high resolution.

It is another object of the invention to reduce the influence of the process of reconstructing compressed binary image data on other image data processes, thereby easily realizing the speed-up and the high resolution of a printer.

It is a further object of the invention to reduce the burden of a CPU responsible for processing image data in a printer, thereby easily realizing the speed-up and the high resolution of the printer.

The reconstruction device for compressed binary image data according to the invention comprises a hardware circuit which is separate from that of a compression device which compresses original binary image data. The compression device compresses original binary image data by using a method in which, while directing attention to parts (for example, bytes) of the original binary image data in a predetermined scan sequence (typically, the raster scan sequence), compresses an attention-directed data part on the basis of a correlation between the data part and a data part to which attention has been previously directed.

The hardware circuit of the reconstruction device comprises: a data hold circuit which holds at least a part (for example, data of a region of plural continuous lines×plural pixels) of binary image data which have been already reconstructed, and shifts the held data part in the predetermined scan sequence; and a smoothing logic circuit which, in response to the data part held by the data hold circuit, conducts a smoothing process on image data contained in the data part. The data hold circuit and the smoothing logic circuit execute a smoothing process in which outlines of characters such as letters and graphics included in the image data are smoothed. The principle of the smoothing process is identical with that of the smoothing circuit of the conventional device shown in FIG. 1.

The hardware circuit of the reconstruction device further comprises a reconstruction logic circuit in addition to the two circuits. The reconstruction logic circuit captures parts of the compressed binary image data in a sequence corresponding to the predetermined scan sequence, and reconstructs the captured compressed data part. The reconstruction logic circuit references a data part in the data part held by the data hold circuit and corresponding to a data part to which attention has been previously directed, thereby reconstructing the captured compressed data part, and supplies the reconstructed data part to the data hold circuit.

In a printer, usually, a CPU is used as a compression device as described with reference to FIG. 1. When the invention is applied to such a printer, the reconstruction process is conducted by a hardware circuit which is separate from the CPU, and hence the CPU is not required to conduct the reconstruction process. As a result, the burden of the CPU is reduced and the CPU is provided with an increased chance of conducting a process other than the reconstruction process. When the compressed image data are to be transferred to the hardware circuit of the reconstruction device, there is a chance that the system bus is used. Since the data to be transferred have been compressed, however, the time period when the bus is occupied can be made shorter than the case where reconstructed data are transferred as in the conventional device. As a result, an image of high resolution can be rapidly printed.

Furthermore, also a smoothing circuit which is mounted in a conventional printer comprises the data hold circuit and the smoothing logic circuit. The reconstruction device of the invention can be configured by adding a reconstruction logic circuit in addition to the data hold circuit and the smoothing logic circuit which are disposed also in the conventional device. Consequently, it is possible to realize the reconstruction device at a small increase in cost.

BRIEF DESCRIPTION OF THE DRAWINGS

FIG. 8 is a diagram showing a comparison of the proportion of the time period when a system bus is occupied in the conventional device and that of the embodiment.

DETAILED DESCRIPTION OF THE PREFERRED EMBODIMENT

Figure 1:
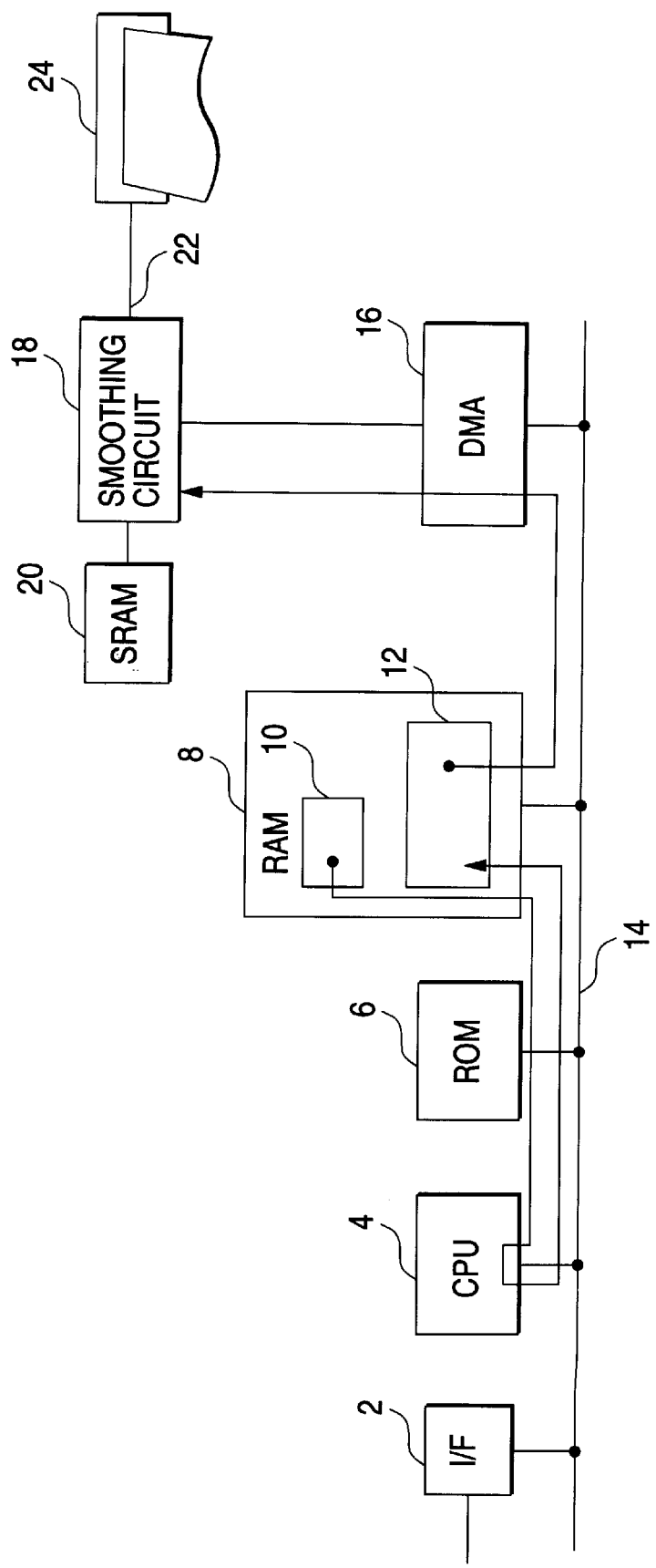
FIG. 1 is a block diagram schematically showing the configuration of a conventional printer.
Figure 2:
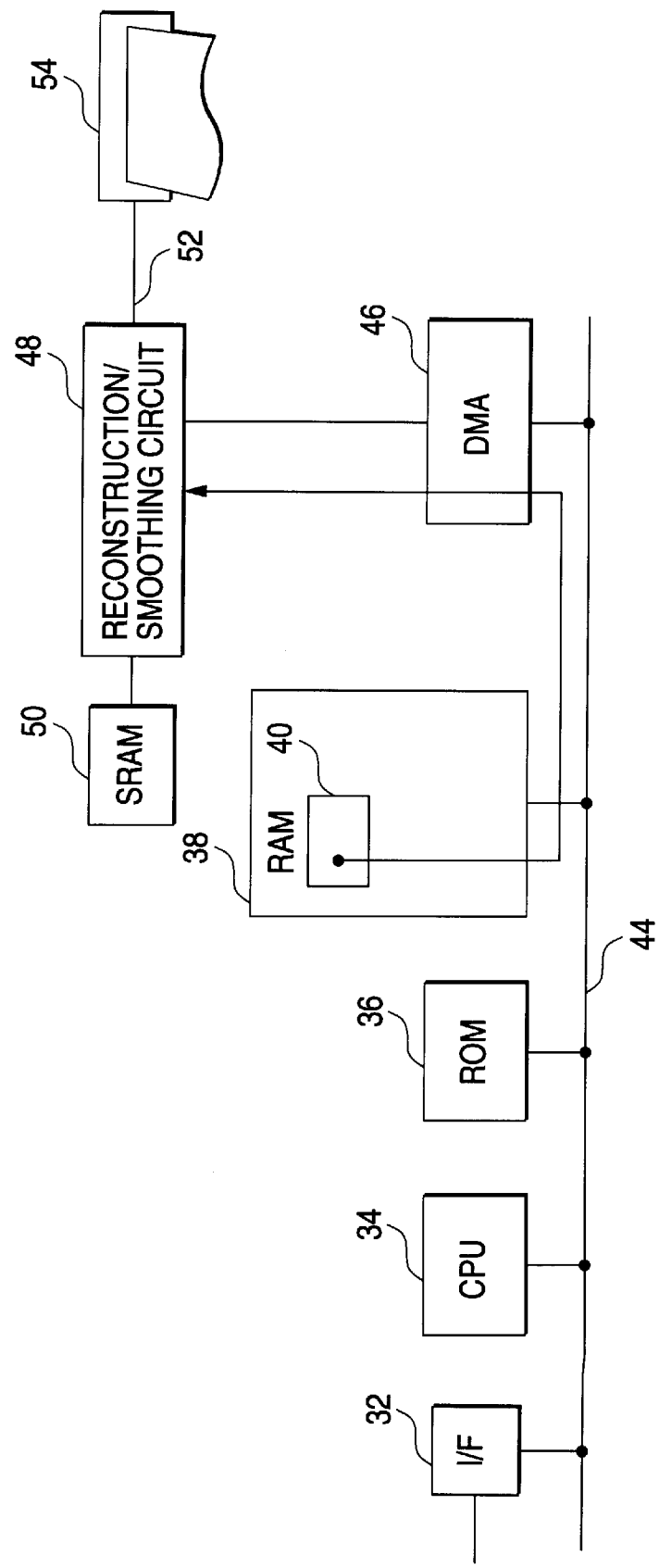
FIG. 2 is a block diagram schematically showing the configuration of an embodiment of a printer which employs the data reconstruction system according to the invention.

FIG. 2 schematically shows the configuration of an embodiment of a printer which employs the data reconstruction system according to the invention. The printer shown in FIG. 2 is most different from the conventional printer of FIG. 1 in that the compressed binary image data which are accumulated in an image buffer 40 of a RAM 38 are read out while maintaining their compressed state (in other words, without being reconstructed by a CPU 34) from the image buffer 40 by a DMA circuit 46, and then transferred to a reconstruction/smoothing circuit 48, and the reconstruction/smoothing circuit 48 reconstructs the binary image data to a shape which the data had before the compression, and corrects the data so as to smooth outlines of characters. The reconstruction/smoothing circuit 48 has the same data correcting function as that of the conventional smoothing circuit 18 shown in FIG. 1, and a further function of reconstructing compressed binary image data. The data reconstructing function can be realized by adding a small number of logic circuits to the smoothing circuit 18 of the conventional device as described later. In this way, the reconstruction/smoothing circuit 48 is responsible for the process of reconstructing compressed image data, and hence the CPU 34 is released from the reconstruction process or does not conduct the reconstruction process. Consequently, the band buffer 12 shown in FIG. 1 does not exist in the RAM 38.

When binary image data are to be compressed and stored in the image buffer 40, the CPU 34 uses the following compression method. In the compression method, attention is sequentially directed to bytes (or bits) constituting binary image data in the raster scan sequence. Specifically, attention is sequentially directed to lines constituting an image in the sequence from the top to the bottom, and, in an attention-directed line, attention is sequentially directed to bytes (or bits) in the line in the sequence from the left to the right or from the right to the left. The attention-directed byte (or bit) is compressed on the basis of a correlation between the byte (or bit) and an adjacent or near byte (or bit) to which attention has been previously directed. In summary, the attention-directed byte (or bit) is compressed on the basis of a correlation between the byte (or bit) and a preceding byte (or bit) in the raster scan sequence. As described later, the process of reconstructing image data which are compressed by a method of such a kind may be executed concurrently with the smoothing process by divertedly using circuit parts (particularly, an SRAM 50 which stores data of plural preceding lines, and a shift register 62 shown in FIG. 6) which are disposed for the purpose of the smoothing process in the reconstruction/smoothing circuit 48. As a result, the time period required for the reconstructing process can be saved and the reconstruction/smoothing circuit 48 can be realized at a low cost by adding only a small number of logic circuits to a smoothing circuit of the conventional device.

Figure 3:
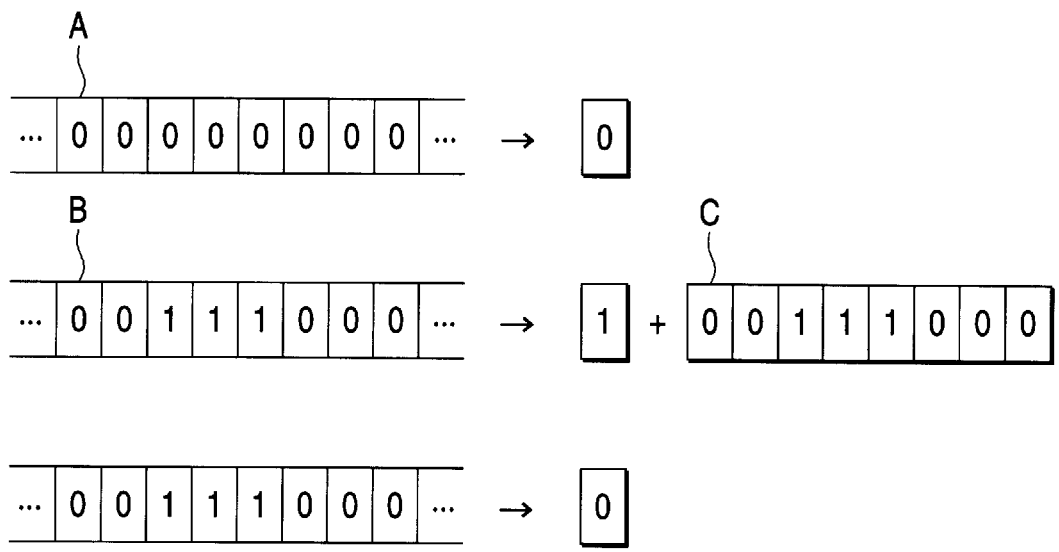
FIGS. 3(A) and 3(B) are diagrams showing a compression method which can be used in the embodiment.
Figure 3:
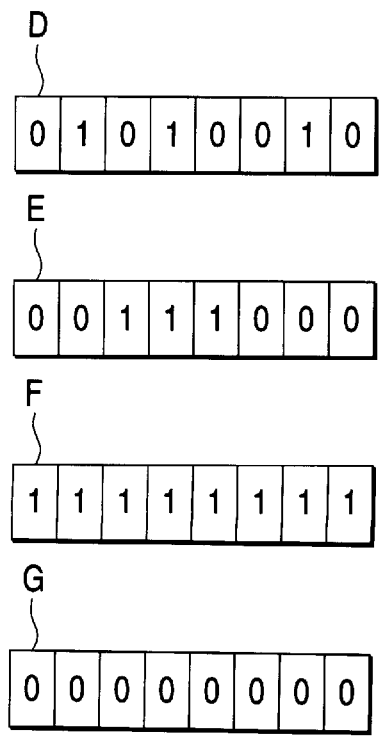

FIGS. 3(A) and 3(B) show a specific example of a compression method which can be used in the embodiment. In the method, compression is conducted in the unit of byte. This method is a compression method of the simplest type in which, as shown in FIG. 3(A), the binary pattern of an attention-directed byte is compared with that of the byte which is in the preceding line and at a corresponding position (i.e., the byte which is immediately above the attention-directed byte), and, if the binary pattern of the attention-directed byte is coincident with that of the immediately-above byte (e.g., in the case of the byte A in FIG. 3(A)), the attention-directed byte A is converted into a one-bit code "0," and, if the binary pattern is not coincident with that of the immediately-above byte (e.g., in the case of the byte B in FIG. 3(A)), the attention-directed byte B is converted into a nine-bit code comprising a one-bit code "1" and a copy C of the attention-directed byte B. When 8 continuous bytes are subjected to the conversion as described above, the one-bit codes of the 8 converted bytes are combined with each other so as to prepare a bit flag D which is one byte long as shown in FIG. 3(B). Following the bit flag D, copies E, F, G, etc. of bytes which are not coincident with the immediately-above byte (i.e., bytes in which the one-bit code in the bit flag C corresponds to "1") are arranged. In this way, compressed data are prepared.

Figure 4:
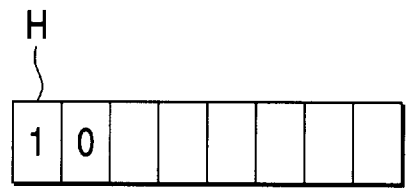
FIGS. 4(A) to 4(C) are diagrams showing another compression method which can be used in the embodiment.
Figure 4:
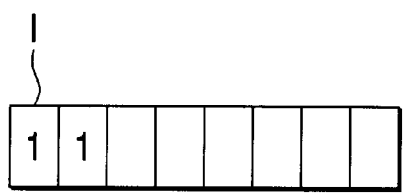
Figure 4:
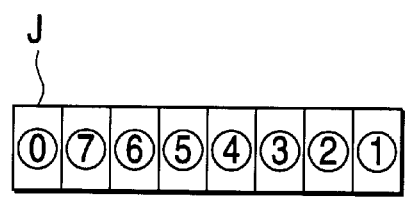

FIGS. 4(A) to 4(C) shows another compression method which can be used in the embodiment. This compression method is an improvement of the method of FIGS. 3(A) and 3(B). When bytes of the same binary pattern repeatedly occur, the number of repetitions is indicated so that the same bytes are prevented from being copied in duplicate, thereby enhancing the compression ratio.

Specifically, the binary pattern of the attention-directed byte is compared with that of the immediately-above byte. If the binary patterns are coincident with each other, a code "10" is set in the high-order 2 digits of a compressed byte (hereinafter, such a compressed byte is referred to as a compressed byte of the first type) as shown in FIG. 4(A). Thereafter, the attention-directed byte is sequentially transferred to the subsequent bytes along the line. Also the subsequent attention-directed byte is checked to see whether it is coincident with the immediately-above byte or not. The number of continuous bytes which are coincident with the respective immediately-above bytes is counted. The number of continuous bytes is set in the low-order 6 bits of the compressed byte H of the first type. The continuation number ranging from 1 to 62 can be set in the 6 bits. In the case where 63 or more bytes are continuous, another compressed byte H of the first type is newly prepared and the remaining continuation number is set in the low-order 6 bits of the new compressed byte.

If the attention-directed byte is not coincident with the immediately-above byte, the attention-directed byte is then compared with the byte which immediately precedes in the line (in the case where the line is scanned in the direction from the left to the right, the left byte). If the attention-directed byte is coincident with the immediately-preceding byte, a code "11" is set in the high-order 2 digits of a compressed byte (hereinafter, such a compressed byte is referred to as a compressed byte of the second type) as shown in FIG. 4(B). Thereafter, the attention-directed byte is sequentially transferred to the subsequent bytes along the line. Also the subsequent attention-directed byte is checked to see whether it is coincident with the immediately-preceding byte or not. The number of continuous bytes which are coincident with the respective immediately-preceding bytes is counted. The number of continuous bytes is set in the low-order 6 bits of the compressed byte of the second type. In the case where 63 or more bytes are continuous, another compressed byte of the second type is newly prepared and the remaining continuation number is set in the low-order 6 bits of the new compressed byte.

If the attention-directed byte is not coincident with the immediately-above byte nor the immediately-preceding byte, a code "0" is set in the highest-order-digit of a compressed byte (hereinafter, such a compressed byte is referred to as a compressed byte of the third type) as shown in FIG. 4(C). Thereafter, the attention-directed byte is sequentially transferred to the subsequent bytes along the line. Also the subsequent attention-directed byte is compared with the immediately-above byte in the same manner as the compression method of FIGS. 3(A) and 3(B). If the bytes are coincident with each other, a one-bit code "0" is set, and, if the bytes are not coincident with each other, a one-bit code "1" is set in the low-order 7 digits of the compressed byte of the third type in the sequence starting from the low digits (i.e., in the sequence of (1)→(2)→(3)→. . . (7)). When continuous 8 bytes including the initial attention-directed byte have been subjected to this process, the compressed byte of the third type is completed. This compressed byte corresponds to the bit flag B in the method of FIGS. 3(A) and 3(B). Thereafter, a copy of a byte of the 8 continuous bytes which is not coincident with the immediately-above byte (i.e., a byte corresponding to the one-bit code "1") is attached to the end of the compressed byte of the third type (hereinafter, such an attached byte is referred to as "a noncoincidental byte").

Figure 5:
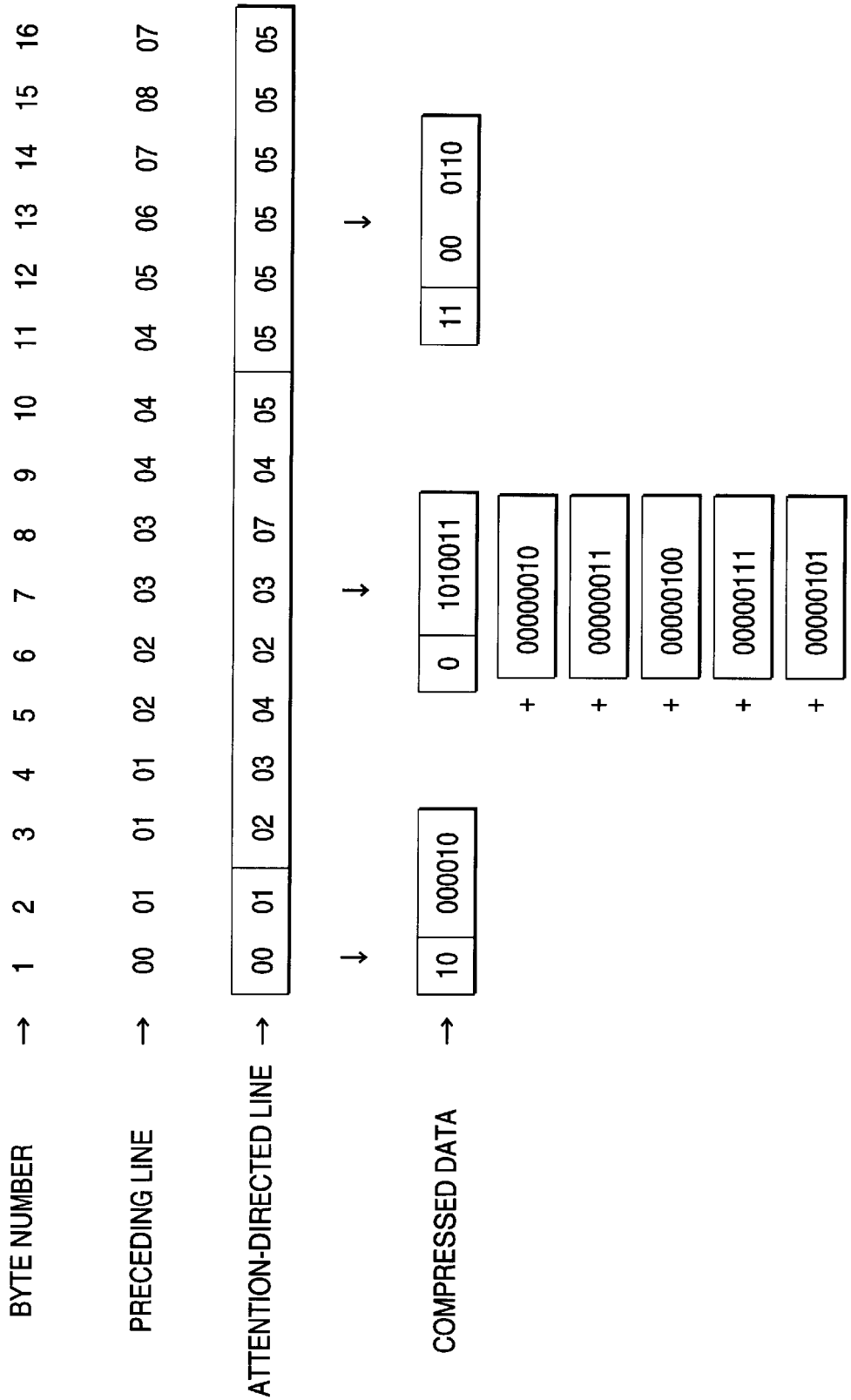
FIG. 5 shows a compression example according to the compression method of FIGS. 4(A) to 4(C), in hexadecimal representation.

FIG. 5 shows a compression example according to the compression method of FIGS. 4(A) to 4(C), in hexadecimal representation. When the attention-directed line shown in FIG. 5 is scanned in the direction from the left to the right, the initial (left end) 2 bytes are coincident with the respective immediately-above bytes and hence they are converted into a compressed byte of the first type "10,000010." The third byte is not coincident with the immediately-above byte nor the immediately-preceding byte. Therefore, the 8 bytes from the third to tenth bytes are converted into data comprising a compressed byte of the third type (bit flag) "0,1010011" and succeeding noncoincidental bytes (copies of the third, fourth, fifth, eighth, and tenth bytes). The 6 bytes from the eleventh to sixteenth bytes are coincident with the respective immediately-preceding bytes, and hence converted into a compressed byte of the second type "11, 000110." In this example, the original 16 bytes are compressed into 8 bytes.

In the above, the two compression methods have been described as examples. It is a matter of course that, according to the invention, other various compression methods may be used as far as the methods use a correlation between an attention-directed byte and a preceding byte.

In the same manner as the conventional device shown in FIG. 1, the above-mentioned compression methods are executed by the CPU 34 of FIG. 2 in accordance with programs supplied from a ROM 36. The compressed binary image data are once stored in the image buffer 40 in the RAM 38. Thereafter, the image data are sequentially read out to the DMA circuit 46 in the raster scan sequence and then transferred to the reconstruction/smoothing circuit 48. In the DMA transfer, a system bus 44 is used. Since the image data to be transferred are compressed, however, the time period when the bus is occupied is shorter than that in the DMA transfer of reconstructed image data in the conventional device shown in FIG. 1. As a result, the time period when the CPU 34 can use the bus 44 can be lengthened.

Figure 6:
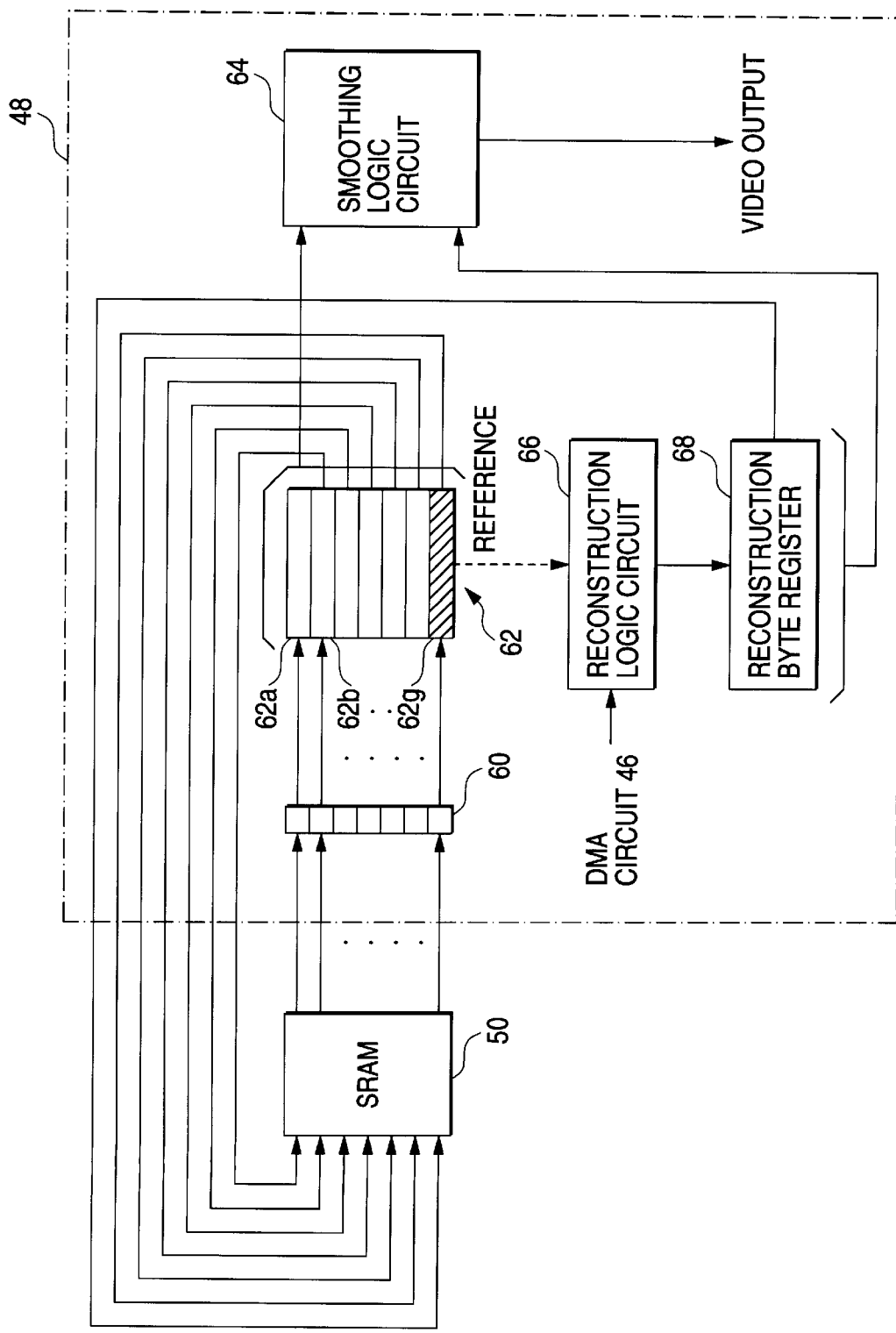
FIG. 6 is a block diagram showing the configuration of a reconstruction/smoothing circuit.

FIG. 6 shows the configuration of the reconstruction/smoothing circuit 48. The circuit 48 operates in synchronization with a clock signal which is not shown. The SRAM 50 which holds reconstructed image data of continuous 7 lines is connected to the circuit 48. The SRAM 50 can hold data of pixels which is smaller in number than pixels of each line from the start to the end by 8 (1 bit per pixel). When the SRAM 50 and the shift register 62 which will be described later are combinedly used, data of all pixels of each of 7 lines from the start to the end can be held. The SRAM 50 is a kind of FIFO memory. In synchronization with the clock signal, for the continuous 7 lines (e.g., from an Nth line to an (N+6)th line) held in the memory, data of one pixel starting from the start of each line are simultaneously read out from the memory to the circuit 48, and, for the continuous 7 lines (e.g., from an (N+1)th line to an (N+7)th line) which are downward shifted by one line from the 7 lines that are currently read out, new data of one pixel starting from the start of each line are written into the memory from the circuit 48. In FIG. 6, among the 7 sets of the input and output lines of the SRAM 50, the uppermost input and output lines correspond to the uppermost line of the 7 lines (i.e., the first line in the raster scan sequence), and the lowermost input and output lines correspond to the lowermost line of the 7 lines.

A latch 60 is disposed in the reconstruction/smoothing circuit 48. The latch 60 holds the pixel data of the same position of the 7 lines which are read out from the SRAM 50, during one clock period, and then supplies the pixel data to the shift register 62 in the subsequent stage. The shift register 62 simultaneously receives the pixel data of the same position of the 7 lines from the latch 60, and shifts pixel data which are currently held to the next state. The shift register 62 has 8 stages so as to hold data of 8 pixels (1 byte) of the same position of the continuous 7 lines (i.e., data of a region of 7 lines×8 pixels). A reconstruction byte register (which also is a kind of shift register) 68 described later holds data 8 pixels (1 byte) of the line which is the lower line next to a line 62g that is the lowermost line in the shift register 62. Therefore, data of a region of 8 lines×8 pixels are held in the combination of the shift register 62 and the reconstruction byte register 68.

The data of 6 lines in the shift register 62 excluding the uppermost line, and the data of the line in the reconstruction byte register 68 are sequentially returned in the unit of one pixel to the SRAM 50 with starting from the start of each line in synchronization with the clock signal, and newly written into the storage regions respectively corresponding to the lines which are shifted by 1 line from the original lines. Specifically, when the uppermost line in the shift register 62 is the Nth line, for example, data of the (N+1)th to (N+7)th lines are newly written into the SRAM 50.

According to this configuration, data of the region of 8 lines×8 pixels in the registers 62 and 68 are horizontally moved in the 8 lines in the unit of one pixel in the direction from the start to the end in synchronization with the clock signal. When the data reach the ends, the region is downward shifted by 1 line so that data are again horizontally moved in a new set of 8 lines from the start to the end, thereby performing update in the raster scan sequence.

A smoothing logic circuit 64 monitors image data of the region of 8 lines×8 pixels in the registers 62 and 68, detects the outline of a character existing in the region, conducts correction for smoothing the outline on pixel data in the center of the region (for example, the fourth pixel data of the fourth line), and outputs the corrected pixel data to the printer engine. Various configurations are known as the specific configuration of the smoothing logic circuit 64. Any of the known configurations may be employed in the embodiment, and hence the description of the specific configuration is omitted.

In the above, a circuit configuration for conducting the smoothing process has been described. When the circuit 48 is requested to conduct only the smoothing process as in the case of the conventional device, bytes of compressed data from the DMA circuit are directly input to the reconstruction byte register 68. By contrast, in the embodiment, a reconstruction logic circuit 66 is added to the circuit 48 in addition to the smoothing logic circuit, in order to conduct the reconstruction process. The reconstruction logic circuit 66 receives compressed image data in the unit of one byte from the DMA circuit 46, reconstructs the image data in a method which is reverse to the above-mentioned compression method, and outputs the reconstructed bytes to the reconstruction byte register 68. As described above, in the compression method, an attention-directed byte is compressed on the basis of a correlation between the byte and a preceding byte in the raster scan sequence. In the reconstruction method reverse to the compression method, therefore, the original data are reconstructed from the attention-directed compressed byte by referencing the reconstructed preceding byte.

In the compression method shown in FIGS. 3(A) and 3(B), for example, a byte is compressed on the basis of a correlation between the byte and the immediately-above byte. In the execution of the reconstruction method corresponding to the compression method, therefore, the reconstruction logic circuit 66 conducts the reconstruction with referencing the byte which is immediately above the byte to be output to the reconstruction byte register 68, i.e., the byte 62g of the lowermost line in the shift register 62. In the compression method shown in FIGS. 4(A) to 4(C), the compression is conducted on the basis of a correlation between the attention-directed byte, and the immediately-above byte and the immediately-preceding byte. In the execution of the reconstruction method corresponding to the compression method, therefore, the reconstruction logic circuit 66 references the bytes which are respectively immediately above and previous to the byte to be output to the reconstruction byte register 68, i.e., the byte 62g of the lowermost line in the shift register 62, and the byte which has been previously held in the reconstruction byte register 68. In either method, the preceding byte(s) to be referenced is available from the smoothing process circuit, and hence the reconstruction logic circuit 66 is not required to have a large memory or register for holding preceding bytes and can be configured only by logic circuits of a small size which are used for executing the reconstruction method.

Figure 7:
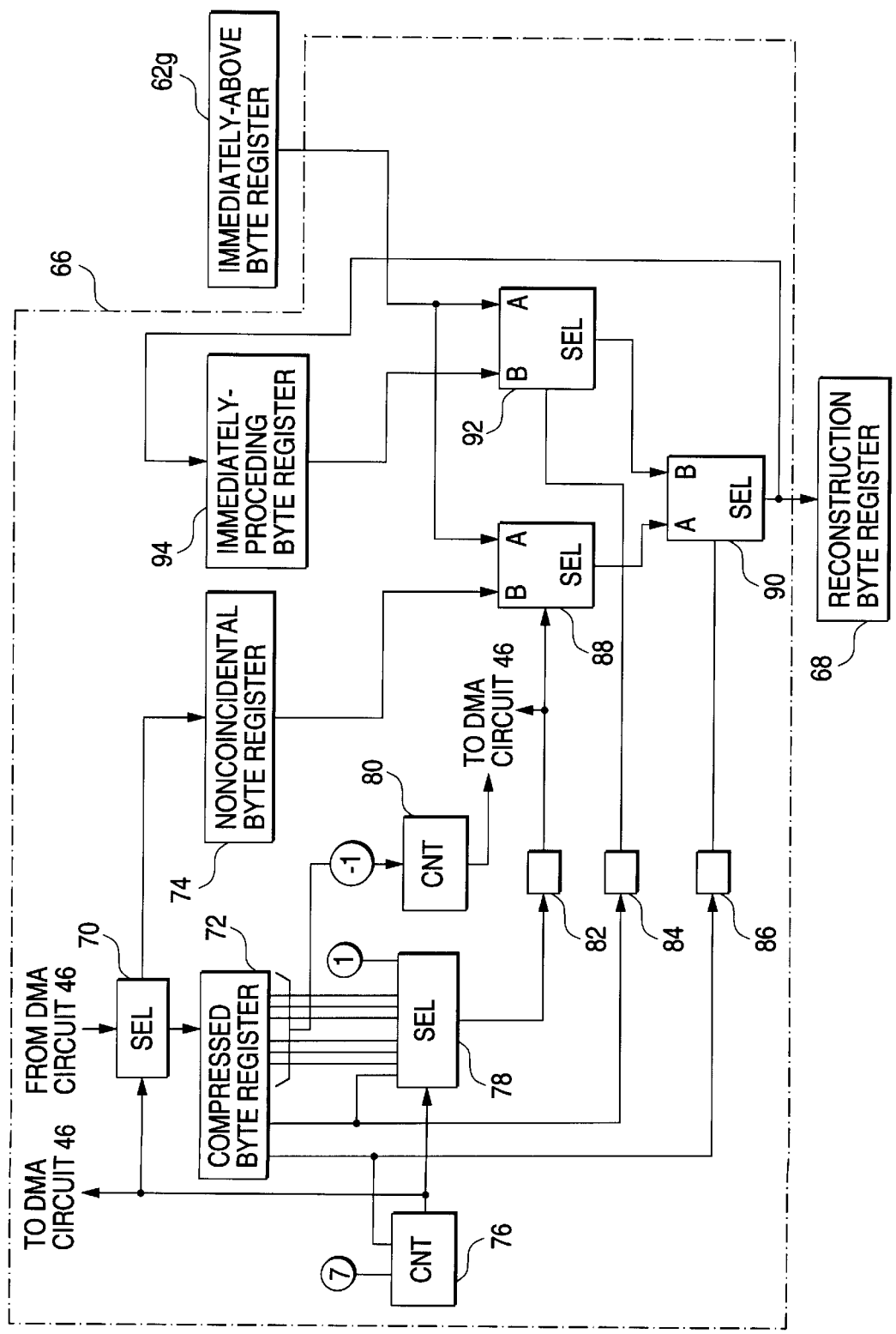
FIG. 7 is a circuit diagram showing the configuration of a reconstruction logic circuit which executes a reconstruction method corresponding to the compression method shown in FIGS. 4(A) to 4(C)

FIG. 7 shows the configuration of the reconstruction logic circuit 66 which is an example for executing the reconstruction method corresponding to the compression method shown in FIGS. 4(A) to 4(C).

The DMA circuit 46 supplies compressed image data in the unit of one byte to the reconstruction logic circuit 66. The byte supplied from the DMA circuit 46 is set via a selector 70 to one of a compressed byte register 72 and a noncoincidental byte register 74. The compressed byte register 72 holds a compressed byte shown in FIGS. 4(A) to 4(C). The noncoincidental byte register 74 holds a noncoincidental byte succeeding a compressed byte of the third type shown in FIG. 4(C). The selector 70 monitors the output of a counter 76 (which is 1 only during the count operation). When the output is 0, the selector selects the compressed byte register 72, and, when the output is 1, selects the noncoincidental byte register 74. As seen from the description below, the count value of 1 means that a compressed byte of the third type is held in the compressed byte register 72 and the process of reconstructing the compressed byte has not yet been completed. Only in the case where this condition is satisfied, a transferred noncoincidental byte is set to the noncoincidental byte register 74. In another case, a transferred compressed byte is set to the compressed byte register 72.

Among 8 bits of the compressed byte held in the compressed byte register 72, the highest-order-digit bit is applied to the trigger terminal of the counter 76. The counter 76 is activated at the timing when the highest-order-digit bit is changed from 1 to 0, so that an initial count value "7" is captured and the output is raised from 0 to 1. Thereafter, the counter 76 is decremented by 1 in synchronization with the clock signal and maintains the output of 1 during the operation. When the count value reaches 0, the count operation is stopped and the output is lowered to 0. In other words, when a compressed byte having the highest-order-digit bit of 0 or a compressed byte of the third type is set to the compressed byte register 72, the counter 76 is activated so that the output is raised to 1, and maintains the output at 1 during 7 clock periods. Thereafter, the output is returned to 0.

The output of the counter 76 is applied to the control terminal of a selector 78. A total of 8 bits which are the low-order 7 bits of the compressed byte in the compressed byte register 72 and one digit of 1 that is added to the lower end of the bits are input to the selector 78. When the value of the control terminal (the output of the counter 76) is 0, the selector always outputs 1. When the value of the control terminal (the output of the counter 76) becomes 1, the selector sequentially selects the 8 bits which are input in synchronization with the clock signal, with starting from the first bit. As seen from the above description, this operation of the selector 78 means that the low-order 7 bits of the compressed byte of the third type held in the compressed byte register 72, and 1 at the further lower order are sequentially read out in synchronization with the clock signal. The output of the selector 78 is delayed by a latch 82 by one clock period, and then applied to the control terminal of a selector 88. The highest-order-digit bit of the compressed byte register 72 is delayed by a latch 86 by one clock period, and then applied to the control terminal of a selector 90.

When the value of the control terminal (the output of the selector 78) is 1, the selector 88 selectively captures the byte in the noncoincidental byte register 74, and, when the value of the control terminal (the output of the selector 78) is 0, captures that in the immediately-above byte register 62g (the register for the lowermost line in the shift register 62). The captured byte is sent to the selector 90. When the value of the control terminal (the highest-order-digit hit of the compressed byte register 72) is 1, the selector 90 selectively captures the byte from a selector 92, and, when the value of the control terminal (the highest-order-digit bit of the compressed byte register 72) is 0, captures that from the selector 88. The captured byte is set to the reconstruction byte register 68.

During a time period when a compressed byte of the third type is held in the compressed byte register 72, the selector 88 receives the value of 1 (the output of the selector 78) at the control terminal in the clock period immediately after when the compressed byte of the third type is set to the register 72, and also in the clock period when a bit(s) of 1 in the low-order 7 bits of the compressed byte is read out to the selector 78 and then output from the latch 82. Therefore, the byte in the noncoincidental byte register 74 is sent to the selector 90. The DMA circuit 46 monitors the output of the counter 76 and that of the latch 86. During a period when the output of the counter 76 is 1, or when a compressed byte of the third type is held in the compressed byte register 72, a noncoincidental byte subsequent to the compressed byte is transferred to the reconstruction logic circuit 66 at the timing when the output of the latch 82 is raised from 0 to 1. Consequently, the transferred noncoincidental byte is set to the noncoincidental byte register 74, and immediately sent to the selector 90 by the selector 88.

By contrast, in the clock period when a bit(s) of 0 in the low-order 7 bits of the compressed byte of the third type in the register 72 is read out to the selector 78 and then output from the latch 82, the selector 88 receives the value of 0 (the output of the selector 78) at the control terminal. Therefore, the byte in the immediately-above byte register 62g is sent to the selector 90. As seen from the above description, the byte in the immediately-above byte register 62g is the byte which is immediately above the byte to be set to the reconstruction byte register 68. In this case, therefore, the immediately-above byte is sent to the selector 90.

When the compressed byte of the third type is held in the compressed byte register 72, the selector 90 receives at the control terminal the value of 0 of the highest-order-digit bit of the compressed byte. Consequently, the noncoincidental byte or the immediately-above byte from the selector 88 is set to the reconstruction byte register 68.

When the compressed byte of the third type is set to the compressed byte register 72 in this way, the noncoincidental byte or the immediately-above byte is set to the reconstruction byte register 68 in accordance with the values of the bits of the compressed byte. This is the execution of the reconstruction method reverse to the above-described compression method which is conducted in the preparation of the compressed byte of the third type.

The circuit portion which has been described above conducts the reconstruction process relating to a compressed byte of the third type. Next, a circuit portion which conducts the reconstruction process on compressed bytes of the first and second types shown in FIGS. 4(A) and 4(B) will be described.

The above-described process of reconstructing a compressed byte of the third type is completed at the eighth clock period. In the eighth clock period, the output of the counter 76 is returned from 1 to 0. When the output of the counter 76 is returned from 1 to 0, the DMA circuit 46 transfers a new compressed byte to the reconstruction logic circuit 66. At this time, the output of the counter 76 is 0. Consequently, the selector 70 sets the new compressed byte to the compressed byte register 72. If the new compressed byte is of the third type, the above-mentioned operations are repeated. If the new compressed byte is of the first or second type, the following operations are conducted.

In a compressed byte of the first or second type, as shown in FIGS. 4(A) and 4(B), the highest-order-digit bit is 1. When a compressed byte of the first or second type is set to the register 72, therefore, the highest-order-digit bit of 1 of the compressed byte is applied to the control terminal of the selector 90 after an elapse of one clock period from the setting timing. As a result, the selector 90 is switched to the state where it receives the byte from the selector 92 in place of that from the selector 88 and sets the received byte to the reconstruction byte register 68. Thereafter, during a period when this state is maintained, the output byte of the selector 90 is set to the reconstruction byte register 68 in synchronization with the clock signal, and, as shown in FIG. 6, the byte which is held in the reconstruction byte register 68 during the previous period is written into the SRAM 50 as a new byte and set to an immediately-preceding byte register 94.

After an elapse of one clock period from the timing when the compressed byte of the first or second type is set to the register 72, the seventh bit of the compressed byte is applied via a latch 84 to the control terminal of the selector 92. When the seventh bit of the compressed byte is 0 (i.e., in the case of a compressed byte of the first type), therefore, the selector 92 captures the immediately-above byte in the immediately-above byte register 62g, and, when the seventh bit is 1 (i.e., in the case of a compressed byte of the second type), the selector 92 captures the immediately-preceding byte in the immediately-preceding byte register 94. The captured byte is sent to the selector 90. As a result, in the case of a compressed byte of the first type, the immediately-above byte is set to the reconstruction byte register 68, and, in the case of a compressed byte of the second type, the immediately-preceding byte is set to the register 68.

When the compressed byte of the first or second type is set to the register 72, the low-order 6 bits of the compressed byte (i.e., the continuation number) is subtracted by one and the subtraction result is input to a counter 80 as the initial count value. When the initial count value is input, the output of the counter 80 is raised from 0 to 1, and the decrementing count operation is started in synchronization with the clock signal. When the count value reaches 0, the output of the counter 80 is returned from 1 to 0 and the count operation is stopped. The DMA circuit 46 monitors the output of the counter 80. During a period when the output of the counter 76 is 0, a new compressed byte is transferred in response to the fall of the output of the counter 80 from 1 to 0. When a new compressed byte of the first or second type is once set to the register 72, therefore, the compressed byte is kept to be held in the register 72 until the output of the counter 80 becomes 0, or until the clock periods corresponding to the continuation number elapse. During the time period, immediately-above or immediately-preceding bytes the number of which corresponds to the continuation number are repeatedly set to the reconstruction byte register 68.

According to this configuration, the reconstruction method which is reverse to the compression method for compressed bytes of the first and second types that has been described with reference to FIGS. 4(A) and 4(B) is executed.

In the invention, in place of the compression method used in the embodiment, the TIFF compression or the run-length compression may be used.

As seen from the above description, according to the invention, the processes of reconstructing and smoothing compressed image data are executed in a parallel manner by the reconstruction/smoothing circuit 48. As compared with the case where circuits for executing these processes are separately disposed, therefore, the circuit scale can be reduced and the processing speed is enhanced.

As a further effect, the CPU 34 is released from the reconstruction process so that its process burden is lowered. With respect to the reconstruction process, the system bus is occupied only when compressed image data are subjected to the DMA transfer, and hence the time period when the bus is occupied is shorter than that in the conventional device, with the result that the proportion of the time period when the CPU 34 can conduct other processes can be increased. FIG. 8 shows a comparison of the proportion of the time period when the system bus is occupied in the conventional device and that of the embodiment. It will be clearly seen from the figure that, according to the embodiment, the proportion of the time period when the CPU 34 can occupy the system bus is increased. Accordingly, a large amount of data of high resolution can be rapidly printed.

What is claimed is:

1. A reconstruction device for compressed binary image data, the binary image data being compressed in such a manner that parts of original binary image data are directed attention in a predetermined scan sequence and an attention-directed data part is compressed on the basis of a correlation between the attention-directed data part and a data part to which attention has been previously directed, comprising:

a data hold circuit which holds at least a part of the binary image data which have been already reconstructed, and shifts the held data part in the predetermined scan sequence;

a smoothing logic circuit which conducts a smoothing process on image data contained in the held data part in response to the data part held by the data hold circuit; and a reconstruction logic circuit which captures parts of the compressed binary image data in a sequence corresponding to the predetermined scan sequence, references the data part to which attention has been previously directed thereby reconstructing the captured compressed data part, and supplies the reconstructed data part to the data hold circuit.

2. A printer comprising:

a compression device which, while directing attention to parts of binary image data in a predetermined scan sequence, compresses an attention-directed data part on the basis of a correlation between the data part and a data part, to which attention has been previously directed; and a reconstruction device for reconstructing the compressed binary image data, the reconstruction device including:

a data hold device which holds at least a part of the binary image data which have been already reconstructed, and shifts the held data part in the predetermined scan sequence;

a smoothing logic device which conducts a smoothing process on image data contained in the held data part in response to the data part held by the data hold device; and a reconstruction logic device which captures parts of the compressed binary image data in a sequence corresponding to the predetermined scan sequence, references the data part to which attention has been previously directed thereby reconstructing the captured compressed data part, and supplies the reconstructed data part to the data hold device.

3. The printer according to claim 2, wherein the compression device is a programmed computer and has a memory which is connected to a system bus of the computer and stores the compressed binary image data, and the reconstruction device captures the compressed binary image data by means of direct memory access which is connected to the system bus of the computer.

4. A reconstructing method for reconstructing compressed binary image data, wherein the binary image data is compressed in such a manner that parts of original binary image data are directed attention in a predetermined scan sequence and an attention-directed data part is compressed on the basis of a correlation between the attention-directed data part and a data part to which attention has been previously directed, comprising the steps of:

holding at least a part of the binary image data which have been already reconstructed;

shifting the held data part in the predetermined scan sequence;

conducting a smoothing process on image data contained in the held data part;

capturing parts of the compressed binary image data in a sequence corresponding to the predetermined scan sequence, referencing the data part to which attention has been previously directed thereby reconstructing the captured compressed data part.

5. The reconstructing method for reconstructing compressed binary image data according to claim 4, wherein reconstructing and smoothing compressed image data are executed in a parallel manner.

* * * * *